United States Patent [19]

Adams

[11] 4,172,035
[45] Oct. 23, 1979

[54] CONVEYOR BELT ATTACHMENT MEANS

[75] Inventor: Thomas C. Adams, Livonia, Mich.

[73] Assignee: AMSTED Industries Incorporated, Chicago, Ill.

[21] Appl. No.: 923,215

[22] Filed: Jul. 10, 1978

[51] Int. Cl.$^2$ ............................................. B01D 33/04
[52] U.S. Cl. .................................... 210/232; 210/400
[58] Field of Search ................. 210/77, 400, 401, 386; 209/307, 308, 272; 198/849, 848, 844; 162/348

[56] References Cited

U.S. PATENT DOCUMENTS 3,807,559   4/1974   Horn ........................................ 210/77

*Primary Examiner*—Frank Sever
*Attorney, Agent, or Firm*—Edward J. Brosius; Fred P. Kostka; John L. Schmitt

[57] ABSTRACT

An apparatus for the quick connection and disconnection of a movable filter belt to a conveyor chain. A projection arm is attached to the conveyor chain, with a portion of the arm extending over the filter belt. A plate is attached to the filter belt. The plate has deflectible arms, and one of the arms has an aperture for receiving a portion of the projection arm.

1 Claim, 3 Drawing Figures

CONVEYOR BELT ATTACHMENT MEANS

BACKGROUND OF THE INVENTION

The present invention concerns a conveyor belt attachment mechanism, and more particularly, a fastener clip for the quick connection and disconnection of a movable filter belt to a conveyor or drive chain.

The present invention is related to, but in no way dependent on, U.S. Pat. No. 3,807,559, issued Apr. 30, 1974, and assigned to the assignee of the present invention. The disclosure of that patent is hereby incorporated by reference.

Known connection apparatus have been shown to have shortcomings in certain areas. In a quick connection type clip where the upper receiving slot arm attached to the filter belt is so constructed that the upper slot arm is connected only to the lower bracket arm, any abnormal loading between the upper slot arm and the conveyor chain projection arm results in the inelastic bending of the upper slot arm upward from the conveyor belt. The conveyor chain attachment is therefore unintentionally disengaged from the bent upper slot belt attachment arm as the chain is inverted in making a return loop.

In such known connection apparatus, the slot clearance in the belt arm can be reduced by such inelastic bending, thereby making the disconnection of the conveyor chain attachment more difficult.

It therefore is an object of the present invention to provide an improved apparatus for the connection and disconnection of a movable filter belt to a conveyor chain drive.

SUMMARY OF THE INVENTION

The attachment means of the present invention consists of two parts. The first part is an arm attached to a conveyor link. The arm projects perpendicular to the path of movement of the conveyor. The arm has a projection attached to its end which extends away from the filter belt. This projection is used to interconnect with a slot in the second part of the attachment means.

The second part of the attachment means is a plate bracket which has a base portion affixed to the movable filter belt. The plate bracket also has an upper arm and a lower arm. The upper arm is attached to the plate portion and has a slot for receiving the projection of the arm attached to the conveyor link. The lower arm is attached to the upper arm, extends back towards the plate portion and is in contact with the filter belt surface. Thus the inelastic bending of the upper plate bracket arm is prevented by the structure of the arms and the contacting of the lower arm with the belt filter.

The construction of the attachment means is such that the upper and lower arms of the plate bracket can be quickly elastically separated by the insertion of a tool, such as a screwdriver, therebetween. When so separated, the arm projection is easily inserted into the upper arm slot. The upper and lower arms then return to their normal positions, and the filter belt is effectively latched to the conveyor chain. Upon the insertion of the tool to elastically separate the upper and lower arms of the plate bracket, the arm projection is easily removed and the filter belt is disconnected from the conveyor chain.

DETAILED DESCRIPTION OF THE PREFERRED EMBODIMENTS

Figure 1:
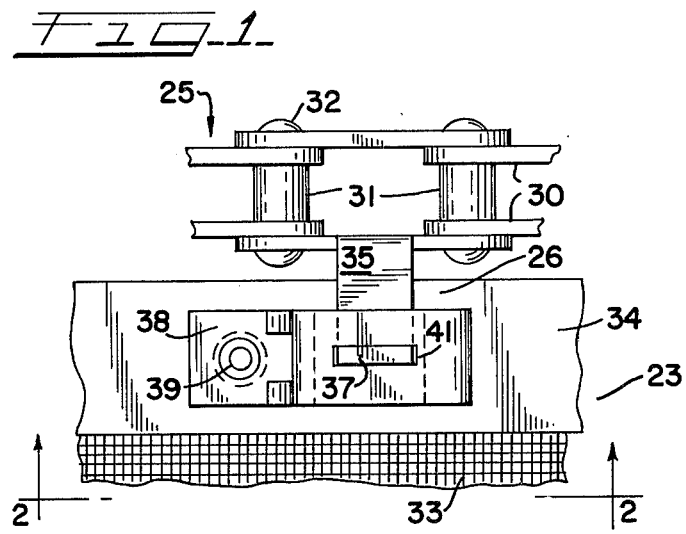
FIG. 1 is a top plan view of the fastener apparatus of the present invention.
Figure 2:
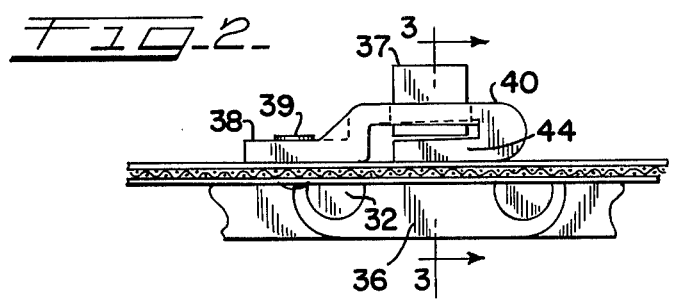
FIG. 2 is a side elevation view of the fastener taken generally along the lines 2—2 of FIG. 1.
Figure 3:
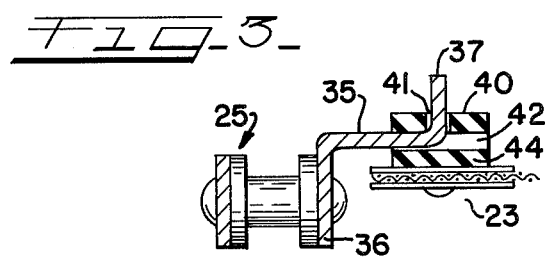
FIG. 3 is a cross-sectional elevation view of the fastener taken generally along the lines 3—3 of FIG. 2.

FIGS. 1-3 show in detail the relationship of the fastener 26 of this invention to conveyor chain 25 and to belt 23. Conveyor or drive chain 25 is shown as a standard link chain comprised of separate links 30 separated and held in place by separators 31 and rivets 32. Belt 23 is comprised of a suitably woven material 33 which is reinforced along the edges by tape 34, which may also be a similar woven material or some other suitable material to provide strength and reinforcement along the driving edge of belt 23.

Fastener 26 consists of two primary parts and does not make use of any permanent fastening device such as nuts and bolts or rivets as a primary fastening component. The preferred material construction of fastener 26 is plastics, but other standard fastener materials such as steel would also be suitable.

As shown in FIGS. 1-3, the first part of the fastener is a plate-like arm or extension 35 suitably attached to or formed integrally with a link 36 of conveyor chain 25. Arm 35 projects laterally from the link 36 in a direction normal to the direction of travel of conveyor chain 25 and toward belt 23. The arm 35 is of sufficient length to overlap the adjacent edge of the belt 23. Attached to and projecting upward from arm 35 is a tong or key 37 which, as will be described later, fits into a slot of the second major component of fastener 26.

As shown in the drawings, link 36, arm 35 and key 37 can be molded or stamped from a single piece of plastic or metal. These components might also be separately fabricated and suitably attached to each other by gluing, spot welding or the like. Also, it is no requirement of the present invention that arm 35 be attached to an integral link of conveyor chain 25 as shown by link 36. A separate linking mechanism suitably affixed to conveyor chain 25 and to which arm 35 would be attached could also be employed.

The improvements of the present invention are directed to the second major component of fastener 26 which comprises a plate 38 suitably affixed to reinforcement tape 34 by rivet 39. Accordingly, the plate is attached to the belt only on the trailing side, as the normal direction of conveyor motion is from left to right in FIG. 1. This offers some allowance for irregularities of dimension in location of sprockets and belt manufacture by permitting realignment of the chain attachment along the line of travel relative to the position of the clip attachment to the belt.

Attached to, projecting from, and in parallel planar relation to plate 38 is a cantilevered projection or upper arm 40 which has a plate-like configuration. Upper arm 40 includes a slot 41 into which key 37 fits. Attached to and projecting from upper arm 40 is a lower arm 44 which is reverse bent to extend back toward plate 38. The lower portion of lower arm 44 rests on belt tape 34. Plate 38 and upper and lower arms 40 and 44 may be molded from a single piece of material or may be separately molded and suitably attached by gluing, welding or some other means. It is important that lower arm 44 and upper arm 40 exhibit spring-like qualities such as found in spring steel or certain plastics.

During the fastening and unfastening operations, it is necessary to enlarge the opening 42 between upper arm 40 and lower arm 44 so as to allow key 37 to pass between the arms and lodge in slot 41. This expansion and enlargement can be accomplished by inserting a simple tool such as a screwdriver into space 42 and using it as a lever or prying device. This simple means for fastening and unfastening the two major components of fastener 26 materially reduces the amount of labor necessary to replace belts 23.

In operation, conveyor chain 25 moves from left to right as viewed in FIG. 1, and thus pulls conveyor belt 23 along in the same direction. The tension applied to plate 38 by key 37 will not tend to inelastically bend open lower arm 44 from upper arm 40 due to the positioning of the lower portion of lower arm 44 against belt tape 34. The construction of plate 38 is such as to permit the elastic enlarging of opening 42 when desired for a connection or disconnection operation, but to prevent the movement of upper arm 40 and lower arm 44 beyond their elastic limits during operation of the conveyor belt.

What is claimed is:

1. In a quick release attachment device for attaching a filter belt to a conveyor chain comprising a first arm attached to and extending from said conveyor chain toward said movable filter belt and at least one projection attached to and extending from said first arm in a direction away from said movable filter belt, a plate bracket consisting essentially of a resilient material such as spring steel or plastic fastened to said movable filter belt, said plate bracket comprising a base portion, an upper arm portion affixed to said base portion and a lower arm portion affixed to said upper arms, means affixing said base portion of said plate bracket to said movable filter belt, said lower arm portion being flexible with respect to said upper arm portion, said upper arm portion having a slot adapted to receive and retain said projection attached to said first arm when said first arm is interposed between said upper and lower arm portions thereby establishing a fastened engagement between said conveyor chain and said moveable filter belt, wherein the improvement comprises said lower arm portion extending back toward said base portion back toward said base portion so as to provide means to hook said movable filter belt; said lower arm portion being so dimensioned so as to prevent movement of said lower arm with respect to said upper arm, within their elastic limits, during operation of the conveyor belt.

* * * * *